Dec. 17, 1929.  E. GROSS  1,740,084

BEARING

Filed June 30, 1926  2 Sheets-Sheet 1

Inventor
E. Gross
by
Attorney

Dec. 17, 1929.    E. GROSS    1,740,084
BEARING
Filed June 30, 1926    2 Sheets-Sheet 2
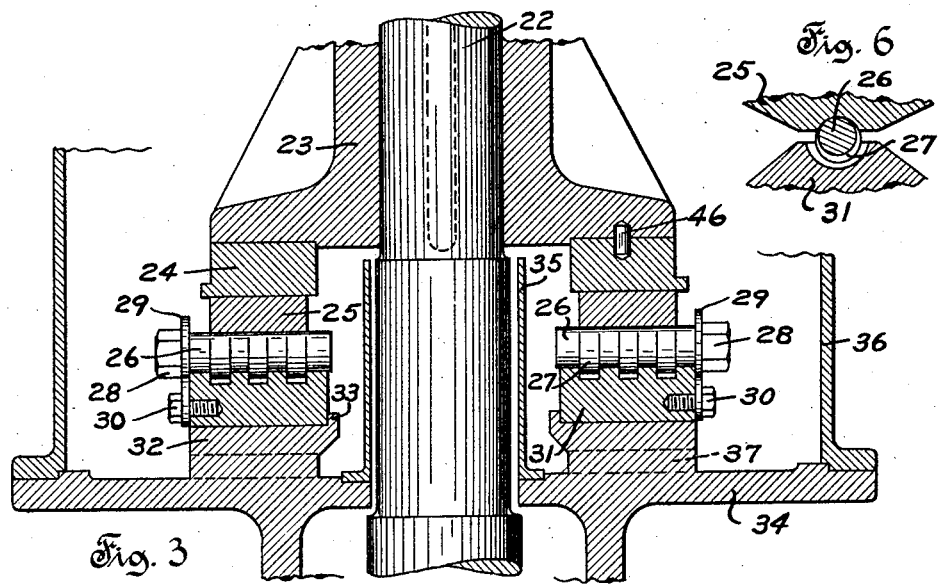
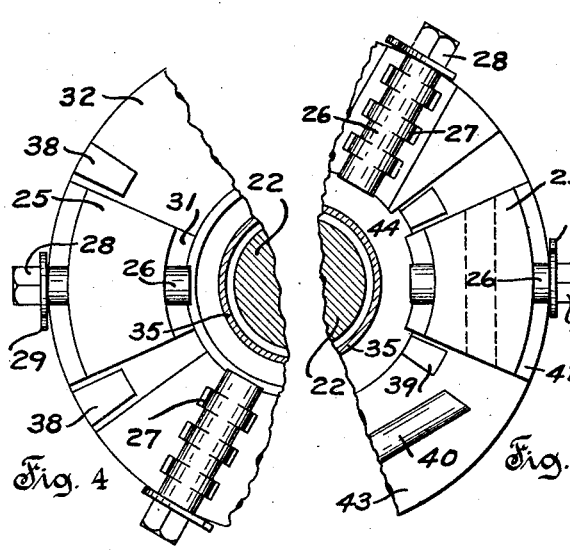
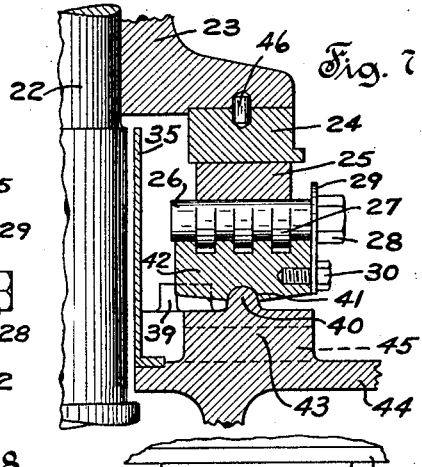
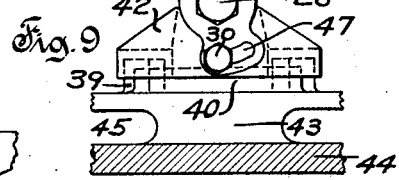
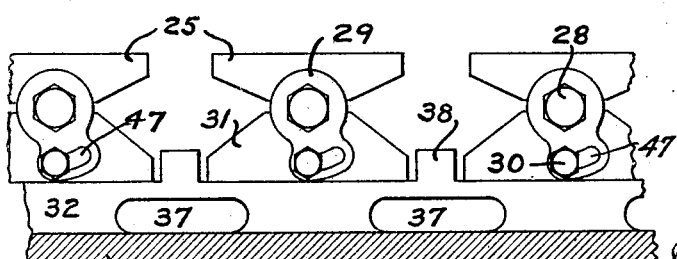
Inventor
E. Gross
by
Attorney Patented Dec. 17, 1929

1,740,084

UNITED STATES PATENT OFFICE

EMIL GROSS, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE

BEARING

Application filed June 30, 1926. Serial No. 119,564.

This invention relates in general to improvements in bearings, and relates more specifically to improvements in the construction of guide or thrust bearings for rotary members such as shafts, and to improved mechanism for adjusting such bearings.

An object of the invention is to provide an improved bearing which is simple in construction and efficient in operation. Another object of the improvement is to provide simple and efficient means for effecting adjustment of bearing structures. A further object of the invention is to provide mechanism for conveniently and effectively positioning several elements of a guide or thrust bearing, so as to insure proper lubrication at the bearing surfaces. These and other objects and advantages will appear from the following description.

A clear conception of several embodiments of the invention and of the manner of effecting adjustment of bearings constructed in accordance therewith, may be had by referring to the drawings accompanying and forming a part of this specification in which like reference characters designate the same or similar parts in the various views.

Fig. 3 is a central vertical section through a thrust bearing embodying the invention.

Fig. 4 is a top view of a fragment of the thrust bearing illustrated in Fig. 3, several of the elements having been removed therefrom.

Fig. 5 is a development of a fragment of the thrust bearing illustrated in Figs. 3 and 4.

Fig. 6 is a section taken transversely through one of the tiltable bearing elements and the supporting structure therefor, of the thrust bearing disclosed in Figs. 3, 4 and 5.

Fig. 7 is a fragmentary central vertical section through another form of thrust bearing embodying the invention.

Fig. 8 is a top view of a fragment of a thrust bearing such as illustrated in Fig. 7, some of the elements having been removed therefrom.

Fig. 9 is an end view of one set of the bearing and supporting elements of the thrust bearing illustrated in Figs. 7 and 8.

Figure 1:
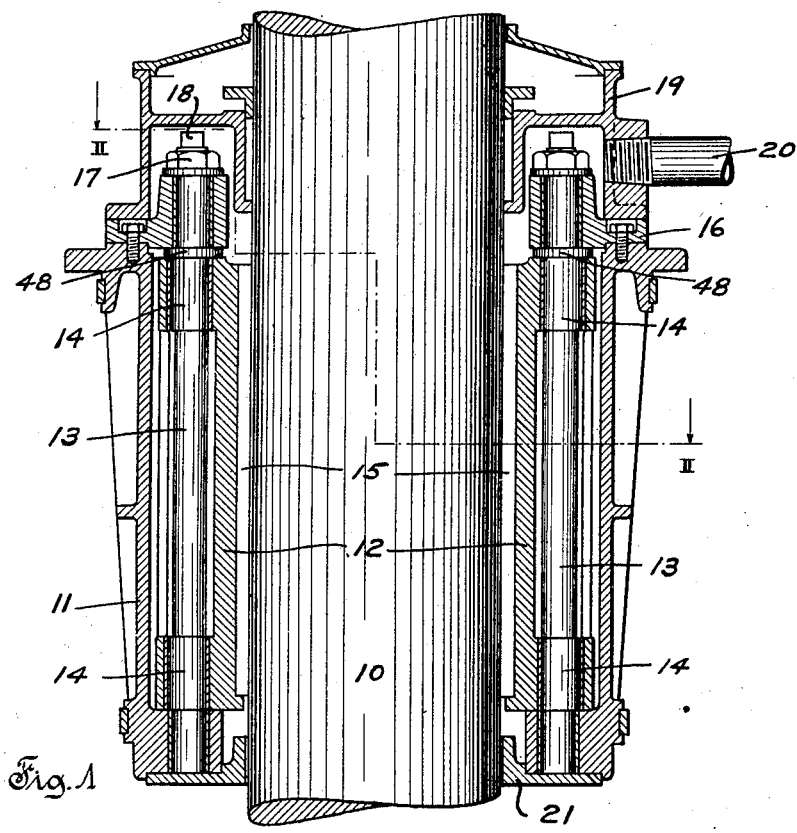
Fig. 1 is a central vertical section through a vertical guide bearing embodying the invention.
Figure 2:
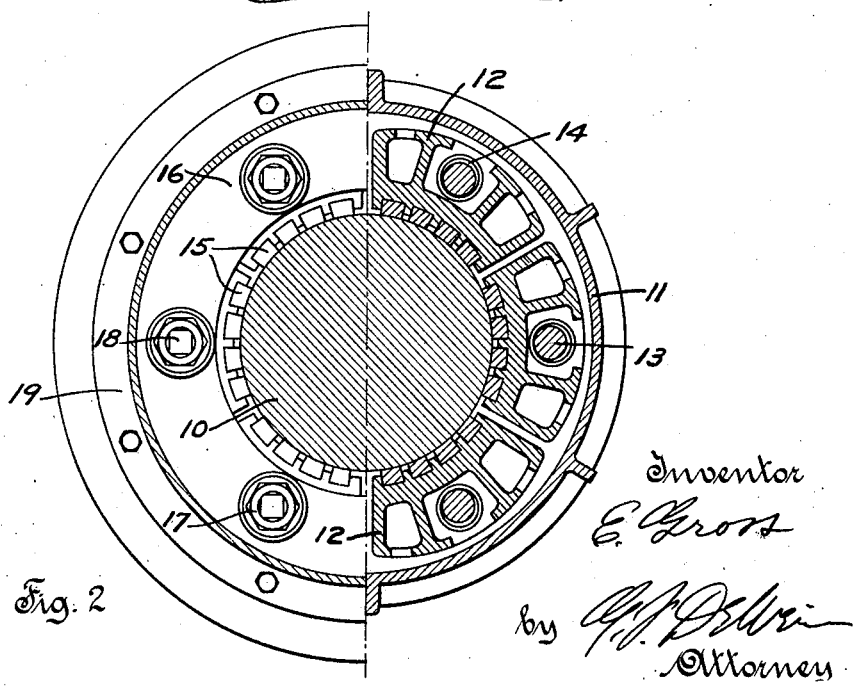
Fig. 2 is a transverse section through the guide bearing of Fig. 1, the section being taken along the line II—II of Fig. 1 looking in the direction of the arrows.

Referring specifically to the embodiment of the invention illustrated in Figs. 1 and 2, an annular series of independent bearing elements or shoes 12 are provided with substantially parallel bearing blocks 15 coacting with the outer surface of a vertical shaft 10. The bearing elements or shoes 12 are provided with alined openings which coact with eccentric portions 14 of vertical pins 13, the pins 13 being rotatable about axes extending substantially parallel to the outer surface of the shaft 10. The lower extremities of the pins 13 are journaled in an outer stationary casing 11, and the upper end portions of these pins are journaled in an adjusting plate 16 which is detachably secured to the stationary casing 11. The portions of the pins 13 directly below the adjusting plate 16 are provided with integral flanges 48 coacting with a lower surface of the plate 16, and the upper extremities of the pins 13 are screw threaded and are further provided with polygonal projections 18. Lock nuts 17 coact with the screw threaded upper portions of the pins 13 and with an upper surface of the plate 16. A cover 19 which coacts with the plate 16 is provided with a lubricant supply pipe 20 for introducing lubricant to the bearing surfaces, and the lower portion of the stationary casing 11 is provided with a closure plate 21.

In the embodiment of the invention specifically illustrated in Figs. 3, 4, 5 and 6, the vertical shaft 22 has a bearing member 23 rigidly attached thereto and rotatable therewith. A thrust plate 24 is secured to the member 23 by means of one or more dowel pins 46, and this thrust plate has a lower surface coacting with upper surfaces of an annular series of tiltable bearing shoes 25. Each of the bearing shoes 25 has a lower recess engaging the eccentric portions 27 of radially disposed pins 26. The pins 26 are rotatably supported upon blocks 31 which rest upon an annular projection 32 associated with a base 34. The outer extremities of the pins 26 are provided with locking plates 29 rigidly attached to the pins by means of nuts 28 which also serve to effect rotation of the pins 26 during adjustment. The plates 29 are provided with arcuate slots 47 within which locking set screws 30 are disposed, the locking set screws 30 coacting with screw threaded openings in the adjacent supporting blocks 31. The inner portion of the annular projection 32 may be provided with a flange 33 forming an abutment for properly positioning the blocks 31. The base 34 is provided with a dam 35 surrounding the shaft 22, and also has an outer wall 36 associated therewith and cooperating with the dam 35 to provide an oil basin completely surrounding the thrust bearing. Openings 37 formed in the projection 32 provide conduits connecting the space immediately surrounding the dam 35 with that surrounding the bearing elements, and the projection 32 may be provided with upwardly extending lugs 38 coacting with the ends of the blocks 31 to further properly position the same.

In the embodiment of the invention illustrated in Figs. 7, 8 and 9, the bearing structure is substantially similar to that of Figs. 3, 4, 5 and 6, but the eccentric pins 26 which support the tiltable bearing shoes 25, are in turn supported upon laterally tiltable blocks 42. The blocks 42 besides having longitudinally or radially extending upper recesses for supporting the pins 26, have transversely or tangentially extending lower recesses 41 engaging projections 40 formed on an annular projection 43 of the base 44. The blocks 42 are properly spaced apart and are retained upon the projections 40 by means of lugs 39 formed integral with the annular projection 43, and the projection 43 is provided with openings 45 extending therethrough radially with respect to the axis of the shaft 22.

During normal operation of the guide bearing illustrated in Figs. 1 and 2, the interior of the stationary casing 11 is provided with lubricant through the supply pipe 20 and this lubricant fills the spaces between the bearing blocks 15 of the shoes 12. The shaft 10 rotates within the annular series of blocks 15 and the bearing surfaces are effectively lubricated in an obvious manner. If for any reason, it becomes desirable to adjust the members or shoes 12 relatively to the rotary shaft 10, the cover 19 may be removed and the lock nuts 17 released, whereupon the pins 13 may be rotated with the aid of the polygonal ends 18, to cause the eccentric portions 14 thereof to move the bearing surfaces of the blocks 15 relatively to the shaft 10. This adjustment may be made upon any number of the members 12, independently of others. After proper adjustment has been effected, the pins 13 may again be clamped in adjusted position by means of the lock nuts 17 and the cover 19 may be restored to normal operating position.

During normal operation of the thrust bearings illustrated in Figs. 3 to 9 inclusive, the member 23 is rotatable with the shaft 22 and carries with it the thrust plate 24. The lower bearing surface of the thrust plate 24 is thus moved along and over the tiltable bearing shoes 25, these bearing shoes being tiltable upon the eccentric portions 27 of the radiating pins 26. The direction of tilting of the shoes 25 is dependent upon the direction of rotation of the shaft 22, and the tilting is caused by the oil which enters in the form of a wedge, between the coacting surfaces of the thrust plate 24 and of the shoes 25. If it is desired to adjust one or more of the shoes 25 relatively to the thrust plate 24, the locking set screws 30 may be released whereupon the pins 26 may be rotated by the application of a wrench to the nuts 28 thereof. When proper adjustment of the shoes 25 has been effected, the pins 26 may again be locked in adjusted position by means of the cap screws 30.

In the embodiment of the invention illustrated in Figs. 3 to 6 inclusive, the shoes 25 are tiltable only laterally, about the pins 26. The supporting blocks 31 are retained in proper position by means of the annular projection 33 and the intermediate lugs 38 and the openings 37 serve to permit oil to circulate freely about the bearing elements.

In the embodiment of the invention illustrated in Figs. 7 to 9 inclusive, the shoes 25 besides being tiltable laterally about the pins 26, are also tiltable longitudinally by virtue of the recesses 41 and the cooperating pivot projections 40. This construction therefore permits both circumferential and radial tilting of the bearing surface of each block 25. The supporting blocks 42 are retained in proper position by the projections 40 and by the lugs 39, and free circulation of oil about the bearing elements is permitted by the openings 45.

It will be apparent that with the structures disclosed in the several embodiments of the invention, the bearing elements are conveniently and independently adjustable relatively to the cooperating rotary member. The adjustable bearing elements may be locked in any desired position of adjustment and the adjustment may be effected at any time in order to produce proper cooperation of the bearing surfaces. The invention is obviously applicable advantageously to both guide and thrust bearings and insures proper lubrication at the bearing surfaces.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a member rotatable about an axis, a plurality of bearing elements spaced about said axis and coacting with a surface of said member, and a rotary eccentric for independently adjusting each of said elements relative to said member, said eccentrics being rotatably adjustable about axes disposed substantially parallel to said surface of coaction.

2. In combination, a member rotatable about an axis, a plurality of bearing elements spaced about said axis, said elements coacting with a surface of said member and being freely tiltable relative to said surface, and a rotary eccentric for independently adjusting each of said elements relative to said member, said eccentrics being rotatably adjustable about axes disposed substantially parallel to said surface of coaction.

3. In combination, a member rotatable about an axis, a plurality of bearing elements spaced about said axis and coacting with a surface of said member, a rotary eccentric for independently adjusting each of said elements relative to said member, said eccentrics being rotatably adjustable about axes disposed substantially parallel to said surface of coaction, and means for locking each of said eccentrics in various positions of adjustment.

4. In combination, a member rotatable about an axis, a plurality of bearing elements spaced about said axis, said elements coacting with a surface of said member and being freely tiltable relative to said surface, a rotary eccentric for independently adjusting each of said elements relative to said member, said eccentric being rotatably adjustable about axes disposed substantially parallel to said surface of coaction, and means for locking each of said eccentrics in various positions of adjustment.

5. In combination, a member rotatable about an axis, a plurality of tiltable bearing elements spaced about said axis and coacting with a surface of said member, and a rotatably adjustable eccentric pivotally supporting each of said elements, said eccentrics being rotatably adjustable to move said elements toward and away from said surface.

6. In combination, a member rotatable about an axis, a plurality of tiltable bearing elements spaced about said axis, said elements coacting with a surface of said member and being freely tiltable relative to said surface, and a rotatably adjustable eccentric pivotally supporting each of said members, said eccentric being rotatably adjustable about axes disposed substantially parallel to said surface of coaction to move said elements toward and away from said surface.

7. In combination, a member rotatable about an axis, a plurality of bearing elements spaced about said axis and coacting with a surface of said member, and a rotary eccentric for independently moving each of said elements toward and away from said member.

8. In combination, a member rotatable about an axis, a plurality of freely tiltable bearing elements spaced about said axis, and a rotary eccentric for independently moving each of said elements toward and away from said member, said eccentrics providing pivotal supports permitting tilting of said elements.

In testimony whereof, the signature of the inventor is affixed hereto.

EMIL GROSS.